US006978428B2

(12) United States Patent
Saxon et al.

(10) Patent No.: US 6,978,428 B2
(45) Date of Patent: Dec. 20, 2005

(54) MODE REGISTER IN AN INTEGRATED CIRCUIT THAT STORES TEST SCRIPTS AND OPERATING PARAMETERS

(75) Inventors: Douglas J. Saxon, Colorado Springs, CO (US); Joseph J. Brehmer, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 87 days.

(21) Appl. No.: 10/369,269

(22) Filed: Feb. 14, 2003

(65) Prior Publication Data

US 2004/0163055 A1 Aug. 19, 2004

(51) Int. Cl.[7] .............................................. G06F 17/50
(52) U.S. Cl. ................. 716/4; 716/6; 716/18
(58) Field of Search ................... 716/4, 6, 18

(56) References Cited

U.S. PATENT DOCUMENTS

| 5,696,771 A | * | 12/1997 | Beausang et al. ........... 714/726 |
| 5,710,711 A | * | 1/1998 | Cheng et al. ................. 716/20 |
| 5,831,868 A | * | 11/1998 | Beausang et al. ............ 716/18 |
| 5,903,466 A | * | 5/1999 | Beausang et al. ............ 716/18 |

* cited by examiner

*Primary Examiner*—A. M. Thompson
(74) *Attorney, Agent, or Firm*—Cochran Freund & Young LLC

(57) ABSTRACT

A mode register is created during the design of a complex, multi-mode electronic circuit. The mode register may contain connections to various switches, clocks, multiplexers, or other portions of the circuit that may have settings necessary to operate the circuit in different modes. The mode register may be used during circuit simulation by setting the mode register to a certain setting when running a static timing analysis script or other type of circuit simulation. After the circuit design is completed and before manufacturing the circuit, the mode register is disabled or removed from the circuit.

8 Claims, 3 Drawing Sheets

200
METHOD OF CREATING A CIRCUIT

300
METHOD OF ANALYZING A MULTI-MODE CIRCUIT

MODE REGISTER IN AN INTEGRATED CIRCUIT THAT STORES TEST SCRIPTS AND OPERATING PARAMETERS

BACKGROUND OF THE INVENTION a. Field of the Invention

The present invention pertains to the design of electronic circuits and specifically to preparations necessary to perform static timing analyses.

b. Description of the Background

Static timing analysis is a method whereby the performance of an electronic circuit may be estimated. In many cases, a circuit may be used in various modes, such as at different clock speeds or with different multiplexer settings. For each mode, a different static timing analysis must be performed.

The general process for performing static timing analysis is to prepare a netlist that contains all of the nodes of a circuit and simulate the performance of the circuit using an analysis tool. A netlist includes the various components and their connections to each other to define the circuit. A static timing analysis script may be generated that defines the conditions for the static timing analysis to be used by the analysis tool. Such a script may include setting specific registers to specific values or initializing specific clocks in a specific manner.

For complex circuits, many clocks and registers may have to be initialized in order to perform a specific timing analysis. For example, a circuit may have the capability to operate a data bus according to two different standards. Each of the data bus standards may require a specific clock speed and may also require certain sections of the circuit to be active and configured in a certain manner.

Static timing analyses, as well as other simulations of the circuit, are performed many times during the course of designing and developing the circuit. As the circuit is tested and developed, the designer may need to run an analysis with the circuit in one mode, then switch to a different mode and run another analysis immediately thereafter.

As the complexity of the circuit grows, the various settings for switching between modes may be placed in several different places throughout the circuit. When one engineer is responsible for the design, that engineer may be able to have a full comprehension of all the settings and their various locations throughout the design. When several engineers are involved, such as when several engineers work simultaneously or when one takes over the design task from another, there may not be a cognizant engineer with knowledge of all the required settings to switch modes.

It would therefore be advantageous to provide a system and method for setting the various modes or clock settings of an electronic circuit that may be used throughout the design development phase. It would further be advantageous to have an analysis system and method that is simple to use and easily communicated. It would further be advantageous to have an analysis system and method that does not interfere with the final version of the circuit.

SUMMARY OF THE INVENTION

The present invention overcomes the disadvantages and limitations of the prior art by providing a system and method for providing a mode register for setting parameters in an electronic circuit such that various modes or clocks of the circuit may be switched simply and quickly for simulation. After the simulation has been completed and the design is finalized, the mode register is disabled but may still be part of the physical circuit that is manufactured.

The mode register may have connections to various switch settings, clock settings, multiplexer settings, or other portions of a circuit that have specific settings for the various modes in which a circuit may function. As portions of the circuit are designed that are affected by the different modes, the designer connects that portion to the mode register. In this manner, the mode register acts as a central place for switching between modes.

The mode register may allow a designer to set a small number of bits to prepare a circuit for a simulation. For a two-mode circuit, only one bit may have to be set high or low to switch an entire circuit from one mode to the other. For a four mode circuit, only two bits may have to be set.

The mode register is used during the simulation of the circuits by setting the mode register bits and running the simulation. Rather than maintaining separate analysis scripts for the simulation for each mode, wherein every specific setting for every portion of the circuit must be changed, the analysis scripts may differ only by the settings of the mode register.

After the circuit is fully simulated and before production, the mode register may be disabled and effectively removed from the circuit. For example, the mode register circuit may actually be manufactured as part of an integrated circuit, but it may be disabled so that it does not affect the normal operation of the circuit.

The present invention may therefore comprise a method for creating an electronic circuit comprising: creating a mode register having at least one setting capable of switching between at least two modes; creating at least one portion of said electronic circuit that may operate in at least two modes; connecting said portion of said electronic circuit to said mode register such that a change to said setting of said mode register may cause said portion of said electronic circuit to change modes; performing a first analysis of said electronic circuit in a first mode; changing said setting in said mode register; performing a second analysis of said electronic circuit in a second mode; and disabling said mode register from said electronic circuit.

The present invention may further comprise an electronic circuit comprising: a portion of said electronic circuit capable of operating in at least two modes; and a mode register having at least one setting capable of switching between two modes and connected to said portion of said electronic circuit such that a change to said setting of said mode register may cause said portion of said electronic circuit to change modes, said mode register being operable in said circuit during the design phase but rendered inoperable prior to manufacturing said electronic circuit.

The advantages of the present invention are that one complexity of the design of a large electronic circuit, that is the settings required to configure a circuit into different modes, is centralized into a mode register. This enables simulations to be developed and run without having to keep track of all the various clock, switch, multiplexer, and other settings that may be required for a proper simulation. With the present invention, the design cycle may be shortened by greatly simplifying the simulation and analysis tasks.

DETAILED DESCRIPTION OF THE INVENTION

Figure 1:
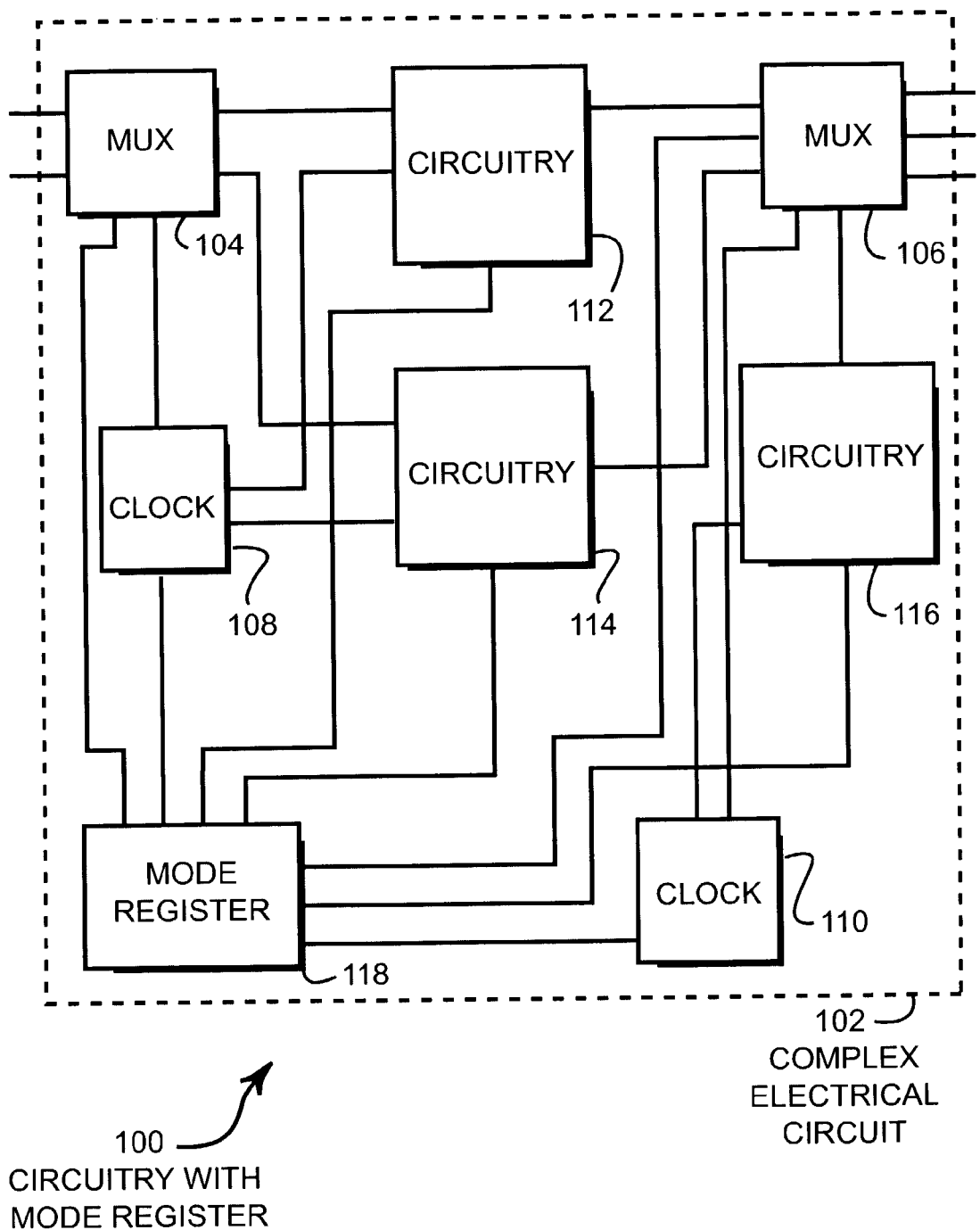
FIG. 1 is an illustration of an embodiment of the present invention of a complex electrical circuit having several circuit blocks and a mode register.

FIG. 1 illustrates an embodiment 100 of the present invention of a complex electrical circuit 102 having several circuit blocks and a mode register 1118. The circuit 102 comprises several circuit blocks, such as multiplexers 104 and 106, clocks 108 and 110, as well as other circuit blocks 112, 114, and 116. The mode register 118 has connections to all of the various circuit blocks.

Complex circuits are frequently designed to operate in several modes. For example, a single integrated circuit may be designed to accept input from two different types of standardized data busses. The first data bus may operate at one clock frequency while the other data bus operates at a second frequency. The circuit may have circuit blocks that apply different transfer functions to the incoming signals based on different modes of operation. Further, there may be multiplexers or switches that switch certain resistances or portions of circuitry in and out of the overall circuit based on these modes of operation.

In some cases, it is common for a circuit to have a mode select bit or other input lines that are used within the circuit to operate in specific modes. In many cases, however, a specific, dedicated input line may not be present to set the modes. In such cases, the designer of the circuit may need to configure the circuit for analysis by setting certain clock, multiplexer, or other switch settings in order to perform analyses of the circuit.

In the embodiment 100, mode register 118 is connected to the various circuit blocks and may be used to set the modes of operation for the overall circuit. For example, the mode register 118 may have a single flip-flop that may be used to toggle the multiplexers, clocks, and other circuits from one state to another. Each circuit block may be designed to have an input line that is used to set the mode and that input line may be connected to the flip-flop of the mode register.

The mode register 118 may have several flip-flops or other devices that may be set during analysis of the circuit. Rather than having to set many different settings for clocks, multiplexers, or other circuits so that an analysis may be performed, the mode register 118 may make all of the changes by setting the register accordingly.

The mode register 118 is designed to be removed or disabled from the circuit after all of the analysis is complete and the circuit is ready for manufacturing. For example, just prior to sending the circuit design to manufacturing, the circuit designer may disable the mode register. In some cases, the designer may remove the mode register completely, while in other cases the designer may only disconnect the input connections so that the mode register does not effect the function or modes of the circuitry.

In some embodiments, the mode register 118 may be disabled but present in the manufactured circuit. In such embodiments, the mode register 118 may be completely inaccessible as part of the normal function of the circuit. Such embodiments may be useful in that further changes or enhancements to the circuit will allow the designer to enable the mode register 118 when the design is modified and retested.

During the design of complex circuits, such as the design of very large scale integrated (VLSI) circuits or other types of circuits, it is often useful to perform static timing analysis or other analyses of the circuit prior to manufacturing the circuit. In general, a design is created that represents the various components and connections of the design. A script is then created that instructs an analysis tool to simulate the circuit. The script and circuit are then simulated by a computer software tool and the results may be analyzed by the design engineer.

Figure 2:
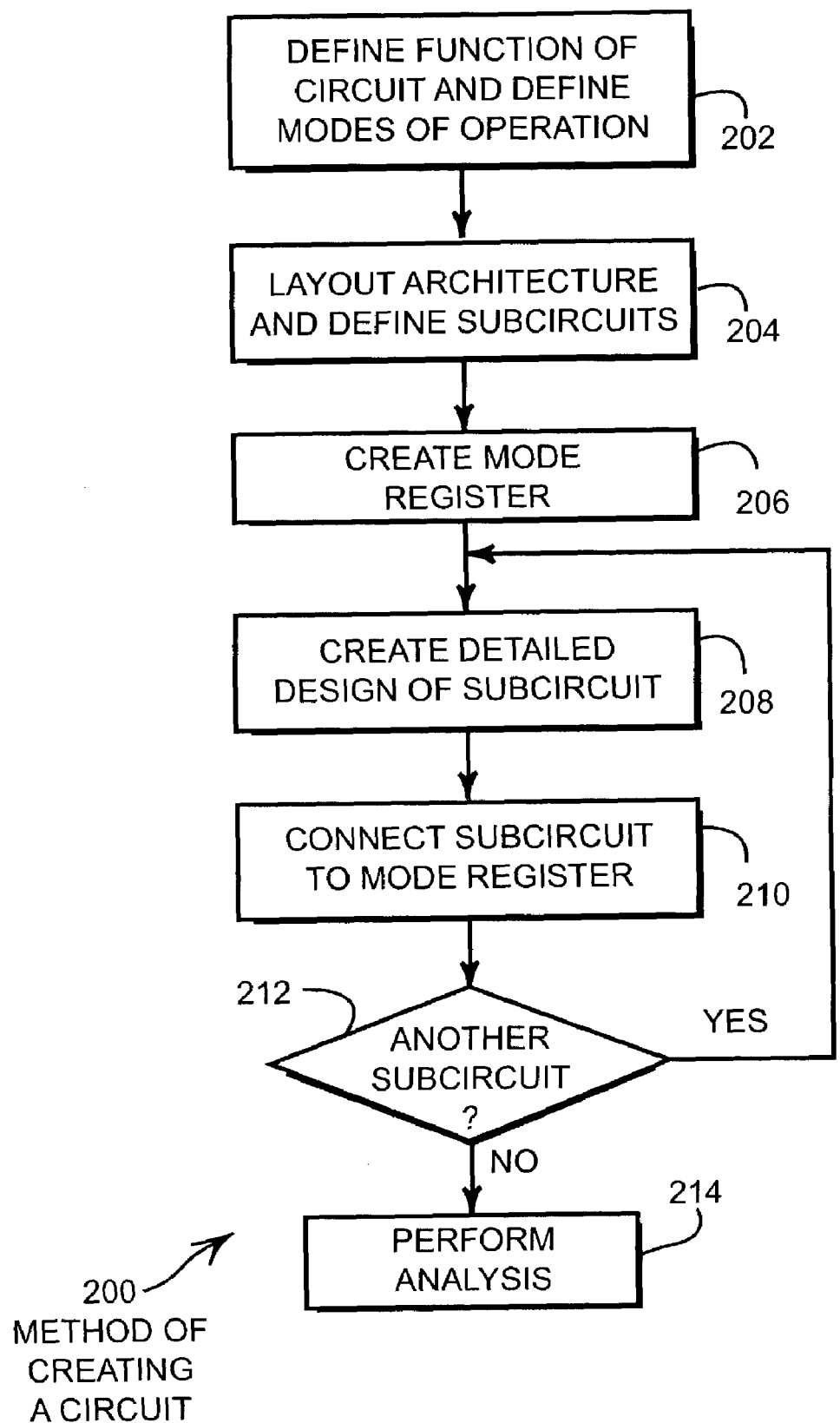
FIG. 2 is an illustration of a flow diagram of an embodiment of the present invention of a method to create an electronic circuit.

FIG. 2 illustrates a flow diagram of an embodiment 200 of the present invention of a method to create an electronic circuit. The function and modes of the circuit are defined in block 202. The architecture and sub circuits within the overall circuit are defined in block 204. The mode register is created in block 206 and a detailed design of a sub circuit is designed in block 208. The sub circuit is connected to the mode register in block 210. If another sub circuit is to be created in block 212, the process returns to block 208. If the circuits are completed in block 212, the analysis may be performed in block 214.

Embodiment 200 is one process whereby many sub circuits may be created and connected to a mode register. The connections may allow the mode register to set the sub circuits to various modes that may be useful during the analysis performed in block 214. The sub circuits may be designed with an input line that can be controlled by the mode register.

Figure 3:
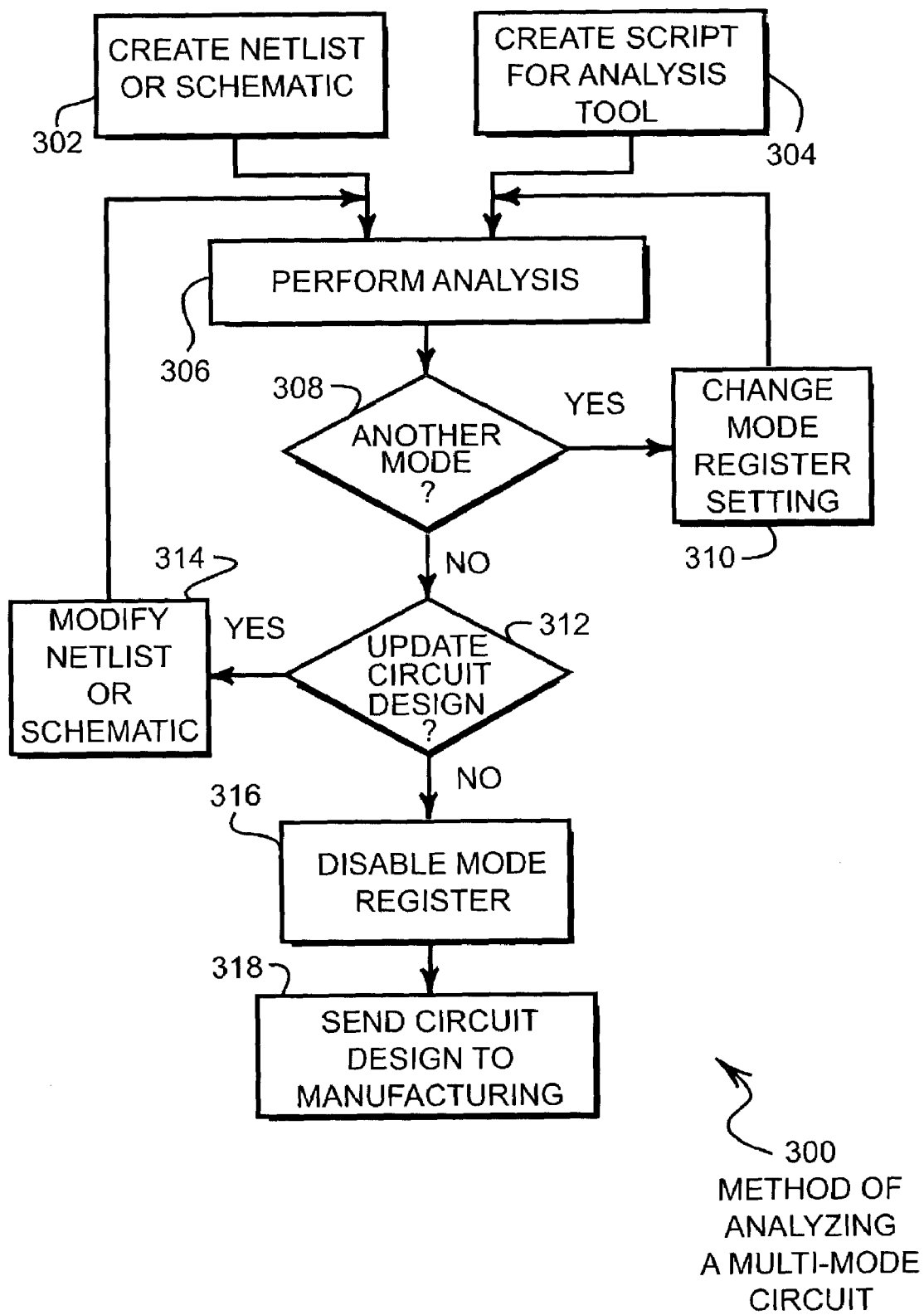
FIG. 3 is an illustration of a flow diagram of an embodiment of the present invention of a method to analyze a circuit containing a mode register.

FIG. 3 illustrates a flow diagram of an embodiment 300 of the present invention of a method to analyze a circuit containing a mode register. The netlist, schematic, or other representation of the circuit is created in block 302. A script for an analysis tool is created in block 304. An analysis is performed in block 306 for a first mode of operation. If another mode is required in block 308, the mode register setting is changed in block 310 and another analysis is performed in block 306. If changes need to be made to the circuit in block 312, they are made in block 314 and another analysis is performed in block 306. After all changes have been made to the circuit, the mode register is disabled in block 316 and the circuit design is sent to manufacturing in block 318.

The script for the analysis tool typically has several parameters that define starting conditions for the analysis. Such parameters include initial settings of clock values, register values, multiplexer settings, switch settings, and other parameters. For each mode of operation for the circuit, many of the settings may need to be changed. By connecting many of the clock, multiplexer, and other switch settings to the mode register, the designer may only have to change the mode register setting rather than having to set the clock, multiplexer, and other switch settings individually. In this manner, the complexity of configuring scripts for analysis tools may be substantially reduced.

The mode register is disabled in block 316. In some cases, the mode register may be completely removed from the circuit design while in other cases, the mode register may be disabled so that the remainder of the circuit may function without the effects of the mode register. Many different methods for disabling the mode register may be used by those skilled in the arts while keeping within the spirit and intent of the present invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a plurality of different portions of an integrated circuit in more than one mode comprising:
   generating scripts that perform analysis tests of at least a part of said plurality of different portions of sold integrated circuit;
   generating parameters that control settings of components in at least a part of said plurality of different portions of said integrated circuit so that at least a part of said plurality of different portions of said integrated circuit operates in an analysis test mode and an operational mode;
   storing said scripts and said parameters in a mode register;
   applying control signals to said mode register to download a predetermined set of said scripts and said parameters from said mode register to at least a part of said plurality of different portions of said integrated circuit in accordance with said control signals;
   using said predetermined set of scripts and parameters in at least a part of said plurality of different portions of said integrated circuit to perform said analysis tests of at least a part of said plurality different portions of said integrated circuit;
   applying additional control signals to said mode register to download another predetermined set of parameters from said mode register to at least a part of said plurality of different portions of said integrated circuit in response to said additional control signals to cause at least a part of said plurality at different portions of said integrated circuit to operate in said operational mode; and
   disabling said mode register from said circuit after said analysis tests have been performed.

2. The method of claim 1 wherein said scripts comprise test scripts.

3. The method of claim 1 wherein said parameters comprise clock settings.

4. The method of claim 1 wherein said parameters comprise multiplexer settings.

5. An integrated circuit that includes a plurality of different portions that are operated in an analysis test mode and an operational mode comprising:
   a mode register that stores scripts that generate test sequences that test at least a part of said plurality of different portions of said integrated circuit and stores parameters that control settings of components in at least a part of said plurality of different portions of said integrated circuit so tat at least a part of said plurality of different portions of integrated circuit operates in said analysis test mode and an operational mode;
   first control signals that cause said mode register to download a predetermined set of said scripts and said parameters from said mode register to at least a part of said plurality of different portions of said integrated circuit in response to said control signals so that at least a part of said plurality of different portions of said integrated circuit perform an analysis test; and
   second control signals that cause said mode register to download another predetermined set of parameters from said mode register to at least a part of said plurality of different portions of said integrated circuit in response to said second control signals to cause at least a part of said plurality of different portions of said integrated circuit to operate in said operational mode.

6. The integrated circuit of claim 5 wherein said scripts comprise test scripts.

7. The integrated circuit of claim 5 wherein said parameters comprise clock settings.

8. The integrated circuit of claim 5 wherein said parameters comprise multiplexer settings.

* * * * *